United States Patent [19]

Bremer et al.

[11] Patent Number: 4,799,421
[45] Date of Patent: Jan. 24, 1989

[54] HYDRODYNAMIC SPIRAL-GROOVED JOURNAL BEARING FOR ELECTROMAGNETICALLY ROTATED AND RECIPROCATED COMPRESSOR PISTON

[75] Inventors: Fridtjof Bremer; Everhardus Muijderman, both of Eindhoven, Netherlands

[73] Assignee: U.S. Philips Corporation, New York, N.Y.

[21] Appl. No.: 928,063

[22] Filed: Nov. 6, 1986

[30] Foreign Application Priority Data

Nov. 6, 1985 [NL] Netherlands ................... 8503037

[51] Int. Cl.$^4$ .................. F16C 31/00; F16C 32/06
[52] U.S. Cl. .................................. 92/162 R; 92/175;
92/DIG. 2; 60/517; 417/418; 384/12
[58] Field of Search ............... 384/12, 115; 92/116,
92/158, 160, 162 R, 173, 174, 175, DIG. 1,
DIG. 2, 153; 62/6, 498; 417/350, 417, 418;
60/517-521, 525

[56] References Cited

U.S. PATENT DOCUMENTS

| | | | |
|---|---|---|---|
| 2,479,349 | 8/1949 | Hagg | 384/160 X |
| 2,679,732 | 6/1954 | Dolz | 62/498 X |
| 2,995,122 | 8/1961 | Randall | 92/173 X |
| 3,303,990 | 2/1967 | Curwen | 92/153 X |
| 3,517,973 | 6/1970 | Hirs | 384/115 |
| 4,412,418 | 11/1983 | Beale | 92/173 X |
| 4,596,474 | 6/1986 | Van Roemburg | 384/115 X |

FOREIGN PATENT DOCUMENTS

| | | | |
|---|---|---|---|
| 2213399 | 9/1973 | Fed. Rep. of Germany | 92/162 |
| 953262 | 8/1982 | U.S.S.R. | 417/418 |
| 1079884 | 3/1984 | U.S.S.R. | 417/418 |
| 1086214 | 4/1984 | U.S.S.R. | 417/418 |

OTHER PUBLICATIONS

Hirs, G. G., "The Load Capacity and Stability Characteristic of Hydrodynamic Grooved Journal Bearings", ASLE Transactions, vol. 8, No. 3, 296-305, 1965.

Jones, G. J. et al., "Turbulent Journal Bearings: Dimensionless, Steady-State Performance Charts for the Two-Axial Groove Case", ASLE Transactions, vol. 22, No. 2, 163-174, (1978).

Reason, B. R. et al., "Rapid Design and Performance Evaluation of Steady-State Journal Bearings-A Technique Amenable to Programmable Hand Calculators", ASLE Transactions, vol. 25, No. 3, 429-444, (1981).

Ronald J. Vincent et al., "Test Results of High Efficiency Stirling Machine Components", 17th IECEC, 1982, Los Angeles, Calif., pp. 1867-18 74.

Hsing, F. C., "Formation of a Generalized Narrow Groove Theory for Spiral Grooved Viscous Pumps", Journal of Lubrication Tech., ASME, Jan. 1972, pp. 81-85.

Primary Examiner—Robert E. Garrett
Assistant Examiner—George Kapsalas
Attorney, Agent, or Firm—Brian J. Wieghaus

[57] ABSTRACT

A free-piston Stirling machine has a piston which can reciprocate and also rotate within a cylinder and which is supported and centered in the cylinder by a grooved dynamic bearing, the piston having two end faces which are acted upon during operation by different fluid pressures. The piston includes at least one sealing part having a circular-cylindrical smooth sealing surfaces and at least one bearing part which is provided in its peripheral surface with a groove pattern. The length of the sealing surface and the size of the gap between the sealing surface and the cylinder wall are selected such that the pressure difference across the bearing surface is reduced so that the piston remains free of radial dynamic instability during operation.

20 Claims, 4 Drawing Sheets

HYDRODYNAMIC SPIRAL-GROOVED JOURNAL BEARING FOR ELECTROMAGNETICALLY ROTATED AND RECIPROCATED COMPRESSOR PISTON

BACKGROUND OF THE INVENTION

1. Field of the Invention

The invention relates to an apparatus, more particularly a freely reciprocating piston engine, comprising a piston which can reciprocate and rotate with in a cylinder and which is dynamically supported and centered in the cylinder by means of a grooved dynamic bearing, the piston having two end faces which are acted upon during operation by different fluid pressures.

2. Description of the Prior Art

In a known engine of the kind mentioned in the opening paragraph (described in an article entitled "Test Results of High Efficiency Stirling Machine Components" by R. J. Vincent, W. D. Rifkin and G. M. Benson, pages 1867-1874, presented on the 17th IECEC in 1982 in Los Angles) which is constructed as a freely reciprocating Stirling engine, the possibility is mentioned of supporting the piston hydrodynamically in the cylinder by causing the piston to rotate as well as reciprocate. It should be noted that at higher speeds of rotation, smooth hydrodynamic bearings become unstable due to the so-called "half frequency whirl". According to this article, this is counteracted by providing the piston with a pattern of spiral grooves.

A disadvantge of the known engine is that the pressure difference applied across the piston leads to a decrease in pressure across the hydrodynamic bearing which introduces a radial dynamic instability of the bearing which is of a nature different from that of the said "half frequency whirl" and occurs especially at low speeds of rotation. As a result, the piston has a tendency to occupy an eccentric position in the cylinder, so that the leakage between the piston and the cylinder becomes considerably larger compared with the situation in which the piston is centrically disposed in the cylinder. The eccentricity also results in increased friction and wear.

A possibility of avoiding this kind of instability is to cause the piston to rotate at a high speed, but for various reasons this is often very unattractive.

SUMMARY OF THE INVENTION

The invention has for its object to provide an apparatus of the kind described above comprising a piston having a grooved bearing part, which dynamically centers and supports the piston in the cylinder in a stable manner even at lower speeds of rotation and with a small eccentricity.

The apparatus according to the invention is characterized in that between the two end faces the piston is provided with at least one sealing part having a circular-cylindrical smooth sealing surface and at least one bearing part having in its peripheral surface a hydrodynamically acting pattern of grooves.

The invention is based on the recognition of the fact that a circular-cylindrical smooth sealing surface, when it is disposed centrically in the cylinder, can keep leakage along the piston within acceptable limits, and that with an acceptable pressure difference across the bearing the dynamic instability does not occur even at lower acceptable speeds of rotation.

It has been found that the so-called angle of inclination of a grooved hydrodrnamical bearing becomes larger than 90° when an excessively large pressure difference is applied across the bearing. This angle of inclination is the angle between the line along which the bearing capacity is directed and the line along which the eccentricity exists. At an angle of inclination exceeding 90°, the bearing capacity acts in the same direction as a possible disturbance so that no resetting force is present. The bearing is then unstable.

The angle of inclination of a smooth circular-cylindrical sealing surface is about 90° with a small eccentricity, irrespective of the presence or absence of a pressure difference across the sealing part.

The effect obtained when the pressure difference across the grooved bearing part is entirely or partly eliminated is that the angle of inclination of the bearing part becomes smaller than 90° in such a manner that the positive bearing capacity of the bearing part has a component in the direction of the eccentricity which is larger than the component of the negative bearing capacity of the smooth sealing part. As a result, the piston as a whole has become stable.

Due to the measure taken, the piston will occupy a contactless stable position in the cylinder, as a result of which the leakage and the frictional losses can be minimal.

In one embodiment of the apparatus according to the invention, the axial length and the diameter of each sealing part are chosen so that the pressure difference across each bearing part is at most 20% of the overall pressure difference across the piston.

A favorable embodiment of the apparatus according to the invention is characterized in both sides of each bearing part are in open communication with each other through a duct so that no pressure difference is applied across each of the bearing parts.

In order to ensure a good stable bearing, in a further embodiment, the piston is provided with two axially spaced sealing parts which, when viewed in the axial direction, are located symmetrically adjacent to the two end faces and between which a bearing part is disposed.

In a corresponding manner, in another embodiment, the piston is provided with two axially spaced bearing parts which, when viewed in the axial direction, are located symmetrically between the two end faces and between which a sealing part is disposed.

In a further embodiment of the invention, each bearing part is provided with a pair of groove which pump in opposite axial directions and which together form a herring-bone pattern of grooves.

The invention will be described more fully with reference to the drawings.

DETAILED DESCRIPTION OF THE PREFERRED EBMODIMENTS

Figure 1:
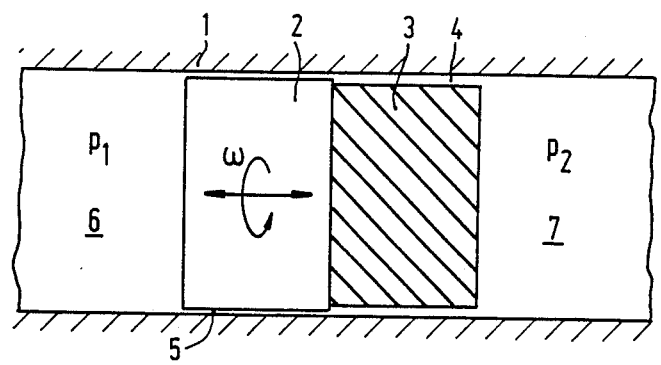
FIGS. 1 to 9 show diagrammatically a number of piston-cylindr combinations with a reciprocating and rotating piston comprising at least one sealing part and at least one bearing part.

In FIG. 1, the cylinder 1 accommodates a piston, which through means not shown can perform reciprocating and rotary movements within the cylinder. The piston comprises a sealing part 2 and a bearing part 3. The bearing part 3 has on its peripheral surface a pattern of grooves 20 which has a pumping effect on a fluid medium in the bearing gap 4 upon rotation of the piston in the indicated direction. The pumping effect is directed to the left as viewed in FIG. 1.

The peripheral surface of the sealing part 2 is smooth, and the dimension of the sealing gap 5 is determined by the choice of the axial length of the part 2 and of its diameter. On one side of the piston a pressure $p_1$ prevails in the space 6, while on the other side a presure $p_2$ prevails in the space 7.

The pressure difference $p_1-p_2$ across the piston results in the fluid medium tending to flow from the space 6 to the space 7, or in the opposite direction, through the gaps 5 and 4.

The gap 5 has parallel walls so that the flow therein does not influence the stability of the sealing part 2 of the piston. For other reasons well known in the prior art, however, such smooth cylindrical surface is always unstable at any speed of rotation with a small eccentricity.

The bearing part 3 is provided with a grooved pattern 20 for dynamically supporting and centering the piston in the cylinder. The bearing part is stable at any speed of rotation if no pressure difference is applied across it. It has now been found that when a pressure difference is applied a disturbance will occur in the medium in the gap 4, which rise to instability. This instability can be prevented by increasing the speed of rotation to a high value, but this is not a very attractive solution. Another possibility is to ensure that little flow occurs in the gap 4. In the embodiment show on FIG. 1 this is achieved by forming the piston with a sealing part 2 and a bearing part 3. The dimensions of the sealing part 2 are chosen so that the major part of the pressure difference across the piston is applied across this sealing part so that only a small pressure difference is applied across the bearing part 3 and consequently the flow in the gap 4 will be limited so that the bearing part 3 occupies a stable centric position in the cyliner. Since the sealing part 2 and the bearing part are rigidly connected to each other, this consequently means that the sealing part 2 also occupies a stable centric position in the cylinder. The leakage through the gap will thus be minimal for the given circumstances.

This principle, according to which the bearing function and the sealing function of a freely reciprocable and rotatable piston are separated at least in part, may be effected in a large number of ways. A number of these embodiments is shown diagrammatically in FIGS. 2 to 10.

Figure 2:
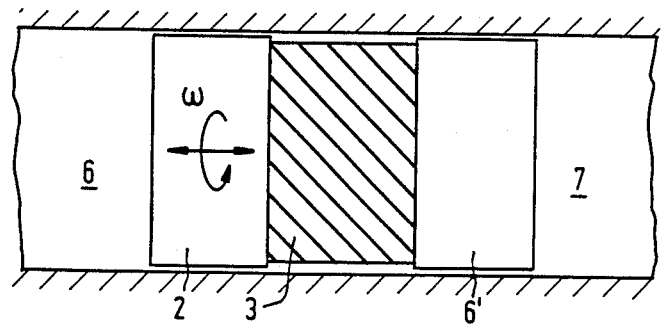

FIG. 2 shows an embodiment in which the piston comprises two axially spaced sealing parts 2 and 6' and an intermediate bearing part 3. The pressure difference is applied in this case for the most part across the sealing parts 2 and 6', while only a small pressure difference is applied across the bearing part 3.

Figure 3:
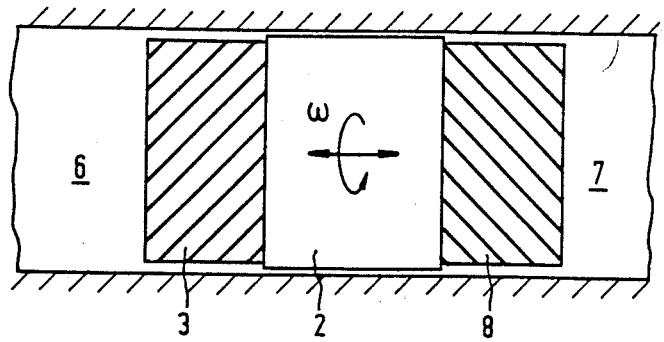

Another embodiment is shown in FIG. 3. In this case the piston comprises two axially spaced bearing parts 3 and 8 and an intermediate sealing part 2. It will be appreciated that also in this case the most part of the pressure difference is applied across the sealing part 2, while only a small pressure difference is applied across the bearing parts 3 and 8.

In the embodiments shown in FIGS. 1, 2 and 3, the bearing part 3 or each of the bearing parts 3 and 8, respectively, is provided with groove patterns 20a-c which have a pumping effect in only one direction.

Figure 4:
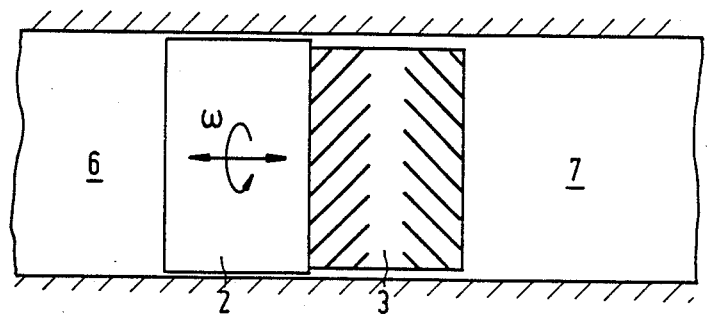
Figure 5:
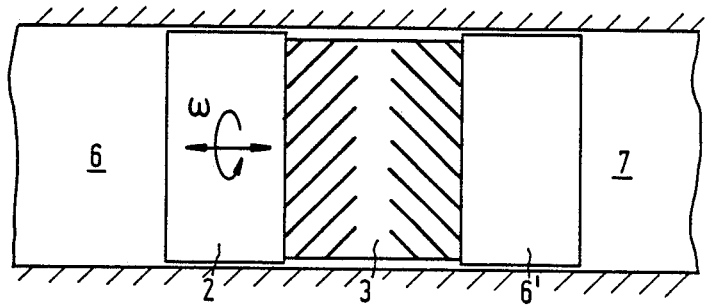
Figure 6:
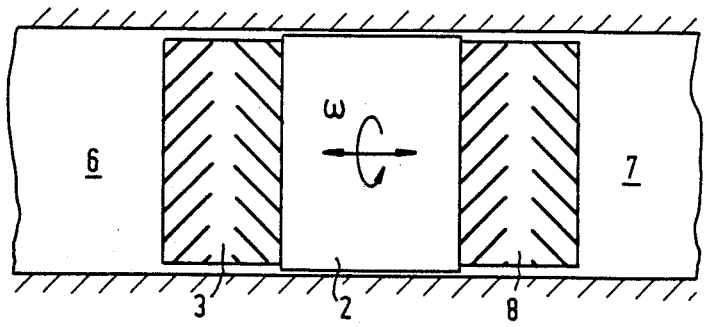

In the embodiments shown in FIGS. 4, 5 and 6, the bearing part 3 or each of the bearing parts 3 and 8, respectively, is provided with a herring-bone pattern of grooves 20, or 20 and 21, respectively each bearing part is provided with a pair of grooves which pump in opposite directions. These embodiments are otherwise identical to those shown in FIGS. 1, 2 and 3, respectively.

Figure 7:
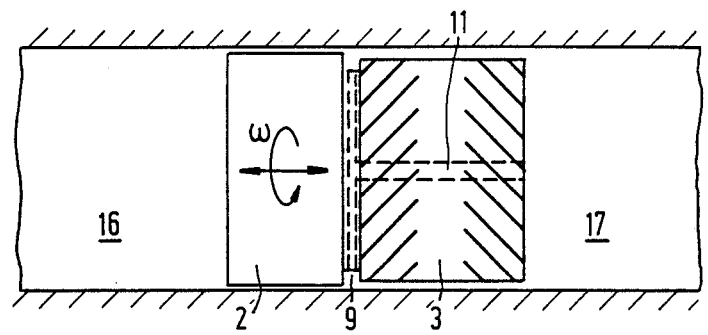
Figure 8:
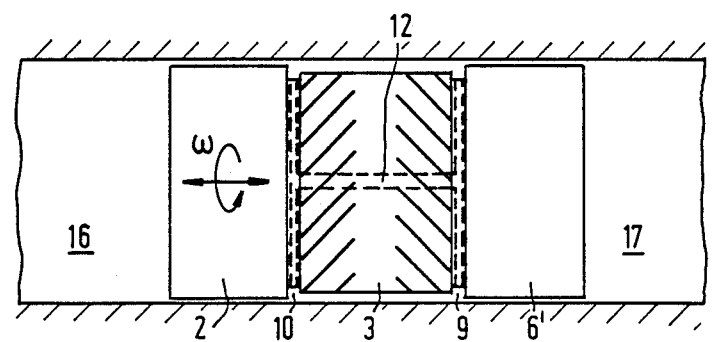
Figure 9:
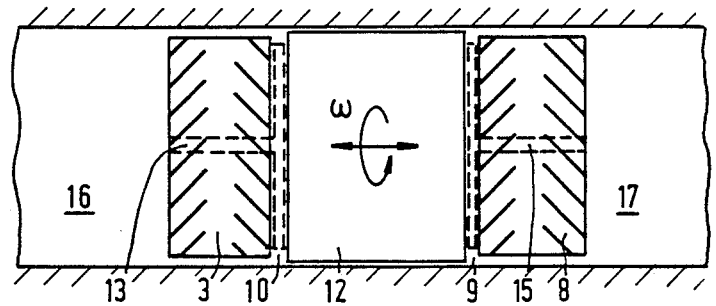

FIGS. 7, 8 and 9 show three possible embodiments in which no pressure difference is applied across the bearing part 3 or either of the bearing parts 3 and 8, respectively. This is achieved by providing a circumferential groove 9, or 9 and 10, respectively, in the peripheral surface of the piston between each bearing part and each sealing part of the piston. In FIG. 7, the groove 9 is connected through a duct 11 to a space 17 on the side of the bearing part remote from the sealing part. The duct 11 assures that the two sides of the bearing part are in open communication with each other and no pressure difference is applied across the bearing part and that the overall pressure difference across the piston is applied across the sealing part 2.

In FIG. 8, circumferential grooves 9 and 10 are formed between the bearing part 3 and the sealing parts 6' and 2, respectively. These grooves 9 and 10 are interconnected through a duct 12 so that the two sides of the bearing part are in open communication with each other and no pressure difference is applied across the bearing part 3.

In the embodiment shown in FIG. 9 circumferential grooves 9 and 10 are formed between the bearing parts 3 and 8, respectively, and the sealing part 2. The groove 10 is connected through a duct 13 to a space 16 on the side of the bearing part 3 remote from the sealing part 2. The bearing part 8 is limited on one side by a groove 9 which is connected through a duct 15 to the space 17 on the side of the bearing part 8 remote from the sealing part 2. Thus, the two sides of each bearing part are in open communication with each other and the pressure difference is applied only across the sealing part 2.

Figure 10:
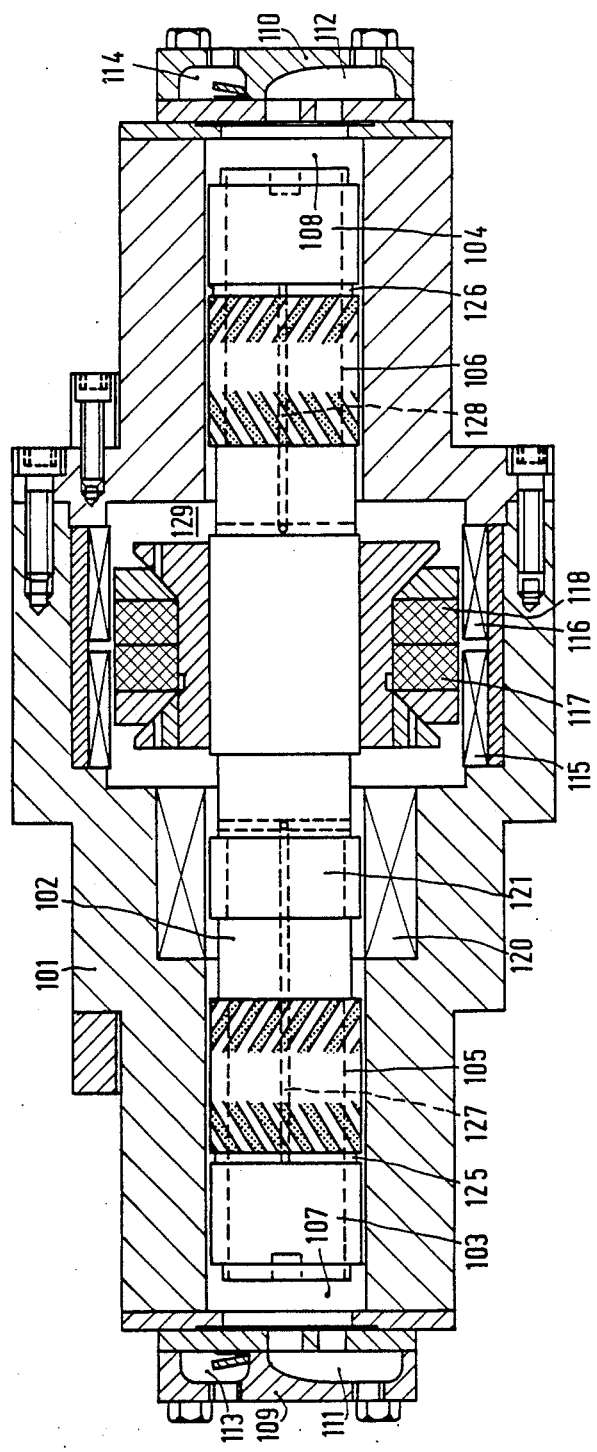
FIG. 10 shows diagrammatically in sectional view a double-acting compressor with a reciprocating and rotating piston.

FIG. 10 shows diagrammatically an example of a double-acting compressor with a free piston. This compressor comprises a cylinder 101 which accommodates a piston 102. The piston 102 is provided on either side with a sealing part 103 and 104, respectively, and with a bearing part 105 and 106, respectively, each provided on its peripheral surface with a herring-bone pattern of shallow grooves. The piston 102 limits on one side a compression space 107 and on its other side a compression space 108. The compression spaces 107 and 108 are sealed by covers 109 and 110, respectively, each provided with inlet chambers 111 and 112 and outlet chambers 113 and 114, respectively.

The cylinder 11 has a wall which supports coils 115 and 116, which cooperate with annular permanent magnets 117 and 118 arranged on the piston 102. By energization of the coils 115 and 116, respectively, the piston 102 can be driven with a reciprocating movement.

The cylinder wall also supports a coil 120 which cooperates with cores 121 on the piston 102 to rotate it.

If desired, the coils 115 and 116 may be integrated with the coil 120 so that the reciprocation and rotation of the piston can be obtained with a single electrical system.

Between the bearing parts 105 and 106 and the sealing parts 103 and 104, respectively. The piston 102 is formed with circumferential grooves 125 and 126, respectively, which are connected through ducts 127 and 128, respectively, to a space 129, which is in open communication with the sides of the bearing parts 105 and 106 remote from the sealing parts 103 and 104, respectively. Thus, it is achieved again that no pressure difference is applied across the bearing parts 105 and 106.

What is claimed is:

1. An apparatus comprising a smooth walled circular cylinder and a piston having a pair of end faces that is reciprocable and rotatable in said cylinder and in which a working fluid is provided in said cylinder for being worked on by said piston during piston reciprocation or for working on said piston to reciprocate said piston in said cylinder, a fluid pressure difference existing across said piston during piston reciprocation which acts on said end faces, the improvement comprising:

means for rotating said piston in said cylinder while said piston is reciprocating; and said piston comprising a bearing part having a pattern of grooves which cooperate with said cylinder wall and said fluid to dynamically support and center said piston in said cylinder for rotating and reciprocating piston movement, and a sealing part for reducing the pressure difference across said bearing part comprising a smooth circular cylindrical surface defining a gap between said sealing surface and said cylinder wall, the length of said surface and the size of said gap being chosen so that the pressure difference across said bearing surface is reduced to a level such that said piston is free of radial dynamic instability and remains stable in said cylinder during piston reciprocation and rotation.

2. An apparatus as claimed in claim 1, wherein said cylinder is surrounded by a housing and said means for rotating said piston comprises a first permanent magnet arranged in said piston and a first energizable coil in said housing electromagnetically cooperating with said first permanent magnet to rotate said piston; and said apparatus comprises means for reciprocating said piston for working on said fluid comprising a second permanent magnet on said piston and a second energizable coil supported in said housing electromagnetically coooperating with said second permanent magnet to reciprocate said piston.

3. An apparatus as claimed in claim 1, wherein said bearing part comprises on its peripheral surface a pair of grooves which each pumps in opposite axial directions and which together form a herring-bone pattern of grooves.

4. An apparatus as claimed in claim 1, wherein said piston comprises two axially spaced sealing parts between which said bearing part is arranged.

5. An apparatus as claimed in claim 4, wherein said sealing parts are symmetrically adjacent said end faces.

6. An apparatus as claimed in claim 4, wherein said bearing part comprises on its peripheral surface a pair of grooves which each pumps in opposite axial directions and which together form a herring-bone pattern of grooves.

7. An apparatus as claimed in claim 6, wherein said piston comprises a peripheral groove between said bearing part and each sealing part, and said bearing part comprises a duct connecting said grooves allowing communication between said grooves for equalizing the pressure across said bearing part.

8. An apparatus as claimed in claim 4 wherein said piston comprises a peripheral groove between said bearing part and each sealing part, and said bearing part comprises a duct connecting said grooves allowing communication between said grooves for equalizing the pressure across said bearing part.

9. An apparatus as claimed in claim 7, wherein said piston comprises two axially spaced bearing parts between which said sealing part is arranged.

10. An apparatus as claimed in claim 9, wherein said bearing parts are symmetrically adjacent said end faces.

11. An apparatus as claimed in claim 9, wherein each bearing part comprises on its peripheral surface a pair of grooves which each pumps in opposite axial directions and which together form a herring-bone pattern of grooves.

12. An apparatus as claimed in claim 11, wherein said piston comprises a peripheral groove between each bearing part and said sealing part, and each bearing part comprising a duct connected to a respective groove and terminating at a respective end face for equalizing the pressure across each bearing part.

13. An apparatus as claimed in claim 9, wherein said piston comprises a peripheral groove between each bearing part and said sealing part, and each bearing part comprising a duct connected to a respective groove and terminating at a respective end face for equalizing the pressure across each bearing part.

14. An apparatus as claimed in claim 1, wherein the length of said sealing surface and the size of said gap between said sealing surface and said cylinder wall are chosen such that any pressure difference across said bearing part is at most 20% of the pressure difference across said piston.

15. An apparatus as claimed in claim 14, wherein said piston comprises two axially spaced sealing parts between which said bearing part is arranged.

16. An apparatus as claimed in claim 15, wherein said bearing part comprises on its peripheral surface a pair of grooves which each pumps in opposite axial directions and which together form a herring-bone pattern of grooves.

17. An apparatus as claimed in claim 16, wherein said piston comprises a peripheral groove between said bearing part and each sealing part, and said bearing part comprises a duct connecting said grooves allowing communication between said grooves for equalizing the pressure across said bearing part.

18. An apparatus as claimed in claim 14, wherein said piston comprises two axially spaced bearing parts between which said sealing part is arranged.

19. An apparatus as claimed in claim 18, wherein each bearing part comprises on its peripheral surface a pair of grooves which each pumps in opposite axial directions and which together form a herring-bone pattern of grooves.

20. An apparatus as claimed in claim 19, wherein said piston comprises a peripheral groove between each bearing part and said sealing part, and each bearing part comprising a duct connected to a respective groove and terminating at a respective end face for equalizing the pressure across each bearing part.

* * * * *